US008553749B2

(12) United States Patent
Carter et al.

(10) Patent No.: US 8,553,749 B2
(45) Date of Patent: Oct. 8, 2013

(54) SIGNAL ENCODING FOR FREQUENCY DIVISION MULTIPLEXING ON TRANSMISSION LINES

(75) Inventors: Richard H Carter, Aberdeen (GB); Mark Hathaway, Canterbury (GB)

(73) Assignee: Aker Subsea Limited, Maidenhead, Berkshire (GB)

( * ) Notice: Subject to any disclaimer, the term of this patent is extended or adjusted under 35 U.S.C. 154(b) by 675 days.

(21) Appl. No.: 12/666,733

(22) PCT Filed: Feb. 21, 2008

(86) PCT No.: PCT/GB2008/000594
§ 371 (c)(1),
(2), (4) Date: Dec. 24, 2009

(87) PCT Pub. No.: WO2009/001024
PCT Pub. Date: Dec. 31, 2008

(65) Prior Publication Data
US 2010/0202541 A1    Aug. 12, 2010

(30) Foreign Application Priority Data

Jun. 25, 2007    (GB) .................................. 0712171.8

(51) Int. Cl.
*H04B 3/32*    (2006.01)
(52) U.S. Cl.
USPC ......................................................... 375/222
(58) Field of Classification Search
USPC ......... 375/241, 242, 260, 262, 265, 219, 220, 375/222; 370/208, 210, 344
See application file for complete search history.

(56) References Cited

U.S. PATENT DOCUMENTS 6,970,416 B1 *  11/2005  McGibney .................... 370/203
2004/0130438 A1 *  7/2004  Garber ......................... 340/10.2

FOREIGN PATENT DOCUMENTS

| EP | 1 742 401 | 1/2007 |
| JP | 2000-286820 | 10/2000 |
| WO | 2007/015466 | 2/2007 |

OTHER PUBLICATIONS

International Search Report for PCT/GB2008/000594, mailed Jul. 22, 2008.

(Continued)

*Primary Examiner* — Young T. Tse
(74) *Attorney, Agent, or Firm* — Nixon & Vanderhye PC

(57) ABSTRACT

A method of transmitting on a transmission line a set of carrier signals of which at least one component represents a respective data value and the carrier signals are of different frequencies ranging from a lowest frequency to a highest frequency, in which the respective component of each carrier above the lowest frequency is adjusted on transmission in accordance with a selected relationship between that respective component and the corresponding component of the next lower frequency so as to compensate for the frequency-dependent effect of the transmission line on those components. The components may be amplitudes. The relationship may be a ratio of the respective and corresponding components. Alternatively each respective component may be adjusted in accordance with a scaling factor dependent on the previous data value presented by the corresponding component of next lower carrier frequency, the scaling factor being a ratio between a predetermined value and the said corresponding component, the predetermined value depending on the said previous data value. The components may be phases and the phase of each carrier after the first may be set from the phase of the previous lower frequency carrier augmented by the ratio of the data value in bits and the number of bits that can be carried by the respective component.

25 Claims, 5 Drawing Sheets

(56) References Cited

OTHER PUBLICATIONS

Der-Zheng Lin et al., "Dapsk-OFDM Transmissions for High Date-Rate Digital Mobile Radio", ISCAS 2001. Proceedings of the 2001 IEEE International Symposium on Circuits and Systems. Sydney, Australia, May 6-9, 2001; vol. 2, pp. 417-420, XP010540667.

Antoniou et al., "High Rate Data Transmission in the Mid-Latitude NVIS HF Channel", Proceedings : Communications, Institution of Electrical Engineers, GB, vol. 153, No. 2, Apr. 1, 2006, pp. 272-278, XP006026147.

Kaiming Liu et al., "High Data Rate Transmission with 64-Dapsk over Fading Channel", Wireless Communications and Networking Conference, 2004, WCNC., Atlanta, GA, Mar. 21-25, 2004., vol. 1, pp. 60-64, XP010708530.

GB Search Report for Application GB 0712171.8 Searched Oct. 10, 2007.

* cited by examiner

SIGNAL ENCODING FOR FREQUENCY DIVISION MULTIPLEXING ON TRANSMISSION LINES

This application is the U.S. national phase of International Application No. PCT/GB2008/000594, filed 21 Feb. 2008, which designated the U.S. and claims priority to Great Britain Application No. 0712171.8, filed 25 Jun. 2007, the entire contents of each of which are hereby incorporated by reference.

TECHNICAL FIELD

This invention relates to the transmission and reception of signals, by means of a multiplicity of signals of different carrier frequency, preferably encoded by means of orthogonal frequency division multiplexing (OFDM) in circumstances, particularly in subsea communication, wherein the transmission medium, such as a transmission line in a subsea umbilical imposes attenuation and/or phase shift which generally significantly vary over the bandwidth of the OFDM signals.

BACKGROUND

It is known, particularly in wireless networks, to encode digital data signals by generating complex-valued numbers connected to a time domain signal, particularly a sinusoid of which the amplitude and phase are determined by the respective complex number. A block of segments can be converted by means of an appropriate transform, usually an inverse 'Fast Fourier transform' (FFT) into a set of time domain signals of which the carrier frequencies are chosen to ensure orthogonality between the components of the set. The components are transmitted simultaneously in an OFDM 'burst'. On reception, the encoding process is reversed, the received signal being sampled (at an appropriate rate) and converted by means of an appropriate transform (e.g. a FFT) into the complex numbers and thence back into the original data signal.

However, a long transmission line, particularly characteristic of those used for communication subsea, imposes significantly more attenuation and phase shift on the higher frequency components of a broadband signal such as an OFDM burst than on the lower frequencies. The present invention is concerned therefore with an improved technique for encoding (and decoding) to reduce the effects of relative attenuation and/or phase shift of the higher frequency components.

BRIEF SUMMARY

According to one aspect of the invention a method of transmitting on a transmission line a set of carrier signals of which at least one component represents a respective data value and the carrier signals are of different frequencies ranging from a lowest frequency to a highest frequency, in which the respective component of each carrier signal above the lowest frequency is set for transmission in accordance with a selected relationship between that respective component and the corresponding component of a lower frequency carrier signal so as to compensate for the frequency-dependent effect of the transmission line on those components.

On reception each respective data value may be decoded from the received values of that component and the corresponding component of the said lower frequency carrier and a function determined by said relationship. The component for the lowest frequency may be employed as a datum.

In another aspect the invention provides a modem for transmitting on a subsea transmission line a set of carrier signals of which at least one component represents a data value and the carrier signals are of different frequencies ranging from a lowest frequency to a highest frequency, in which the modem is arranged to set a respective component of each carrier above the lowest frequency in accordance with a selected relationship between that respective component and the corresponding component of a neighbouring carrier signal so as to compensate for the frequency-dependent effect of the transmission line on those components.

The invention is based on the presumption that the frequency characteristic (i.e. attenuation versus frequency or phase shift versus frequency) of the transmission line is a slowly varying function of frequency.

One manner of performing the invention comprises relating a component (amplitude or phase) of each successive carrier by a fixed ratio to the next lower frequency carrier.

GENERAL DESCRIPTION

In general, $Y(\omega)=H(\omega)\cdot X(\omega)$, where $H(\omega)$ is the frequency response of the line and $Y(\omega)$ and $X(\omega)$ are the output and input signals, respectively. All three functions $H(\omega)$, $Y(\omega)$ and $X(\omega)$ are generally complex. If there were simply two modems in a point to point system, one could measure the frequency response of the connecting line and then divide the received signal by it (in the frequency domain). Ignoring noise, the processed signal would then be equal to the transmitted signal and the amplitudes and phases of each carrier could be recovered. In this event, any modulation scheme could be employed to encode data on each carrier. Unfortunately, this approach does limit the versatility of the modem. Instead, the modulation scheme now developed for general use relies on the fact that $H(\omega)$ will almost certainly be a slowly varying and continuous function of frequency. Therefore if the value of H is known at frequency $\omega$, one can assume it will be roughly the same at a nearby frequency $\omega+\delta\omega$, where $\delta\omega$ is assumed to be small, that is: $H(\omega+\delta\omega)\approx H(\omega)$ as $\delta\omega\to 0$.

The signal generated using the FFT is created using discrete components, $X_n=X(\omega_n)$, where $\delta\omega=(\omega_n-\omega_{n-1})$ is assumed to be small. As discussed in more detail later, the signal is created by assigning complex values to each component $X_n$ and then using the FFT to create a time domain signal for transmission.

In one method according to the invention the ratio of neighbouring carriers, the $n^{th}$ ratio, is defined as: $R_n=X_n/X_{n-1}$ or $X_n=R_n\cdot X_{n-1}$ The first component $X_n$ that is used must be constant and known by all the modems in the network. The rest of the components can then be found using the complex $R_x$ values and the expression above. Once the signal is created, it is transmitted through the transmission line and received a modem at the other end. After processing, the received signal, denoted by $Y_n$, can then be decoded. Assuming a linear response, $Y_n$ can be related to $X_n$: thus $Y_n=H_n\cdot X_n$.

The received ratios can be defined:

$$R_n'=Y_n/Y_{n-1}=(H_n\cdot X_n)/(H_{n-1}\cdot X_{n-1})=(H_n/H_{n-1})\cdot R_n$$

This expression relates the received ratios to the transmitted ratios. If $\delta\omega$ is small then: $H_n\to H_{n-1}$ therefore $H_n/H_{n-1}\to 1$ and $R_n'\to R_n$ Consequently, even though $Y_n$ can be significantly different from $X_n$, the received ratios R' will be in good agreement with the transmitted ratios R despite the transfer characteristic of the transmission line $H_n$.

The Fourier components $X_x$ are complex and can be expressed in polar form as a complex exponential of amplitude $A_n$ and phase $\phi_n$. Accordingly the ratios $R_n$ can be rewritten:

$$X_n = [A_n \exp(i\phi_n)]/[A_{n-1}\exp(i\phi)] = A_n/A_{n-1} \cdot \exp[I(\phi_n - \phi_{n-1})] = r_n \exp(i\Delta\phi_n)$$

where $r_n = A_n/A_{n-1}$ and $\Delta\phi_n = \phi_n - \phi_{n-1}$

The $r_n$ values are (in this example) defined by the ratio of the amplitudes of neighbouring components, and the $\Delta\phi_n$ values represent the difference in phase between neighbouring components. The amplitude ratios and phase differences are how this scheme encodes information. In practice, unless all the amplitude ratios are equal to unity, i.e. $r_n=1$, there is no guarantee that the component amplitudes will not grow too large or too small. To avoid this difficulty, it is preferable that the ratios be less than or equal to one; this prevents $X_n$ growing too large. A minimum ratio may also be defined, e.g. $r_{min}=0.5$; however this does not stop the values of $X_n$ from becoming too small. That may be done by defining a minimum value for $X_n$ as well. If one assumes the first component has an amplitude of unity, and given that $r_{min}=0.5$, the minimum amplitude of $X_n$ will be 0.5 (and therefore $A_{min}=0.5$). When encoding data, $A_n$ is calculated by multiplying $A_{n-1}$ by the ratio $r_n$. If $A_n$ is found to be less than $A_{min}$ it may be recalculated by multiplying $A_{n-1}$ by the reciprocal ratio $1/r_n$. Because $r_n$ is never larger than one, its reciprocal must be larger than one, and the value of $A_n$ will increase relative to $A_{n-1}$. When decoding the data, the amplitude ratios are calculated and if a ratio is found to be larger than unity, one may take its reciprocal. This scheme ensures that the component amplitudes $A_n$ are never less than 0.5 and never greater than 2.

There follows a detailed description of an embodiment of the invention as constituted within a subsea communication system and particularly within modems for communicating by means of an umbilical.

DETAILED DESCRIPTION

Figure 1:
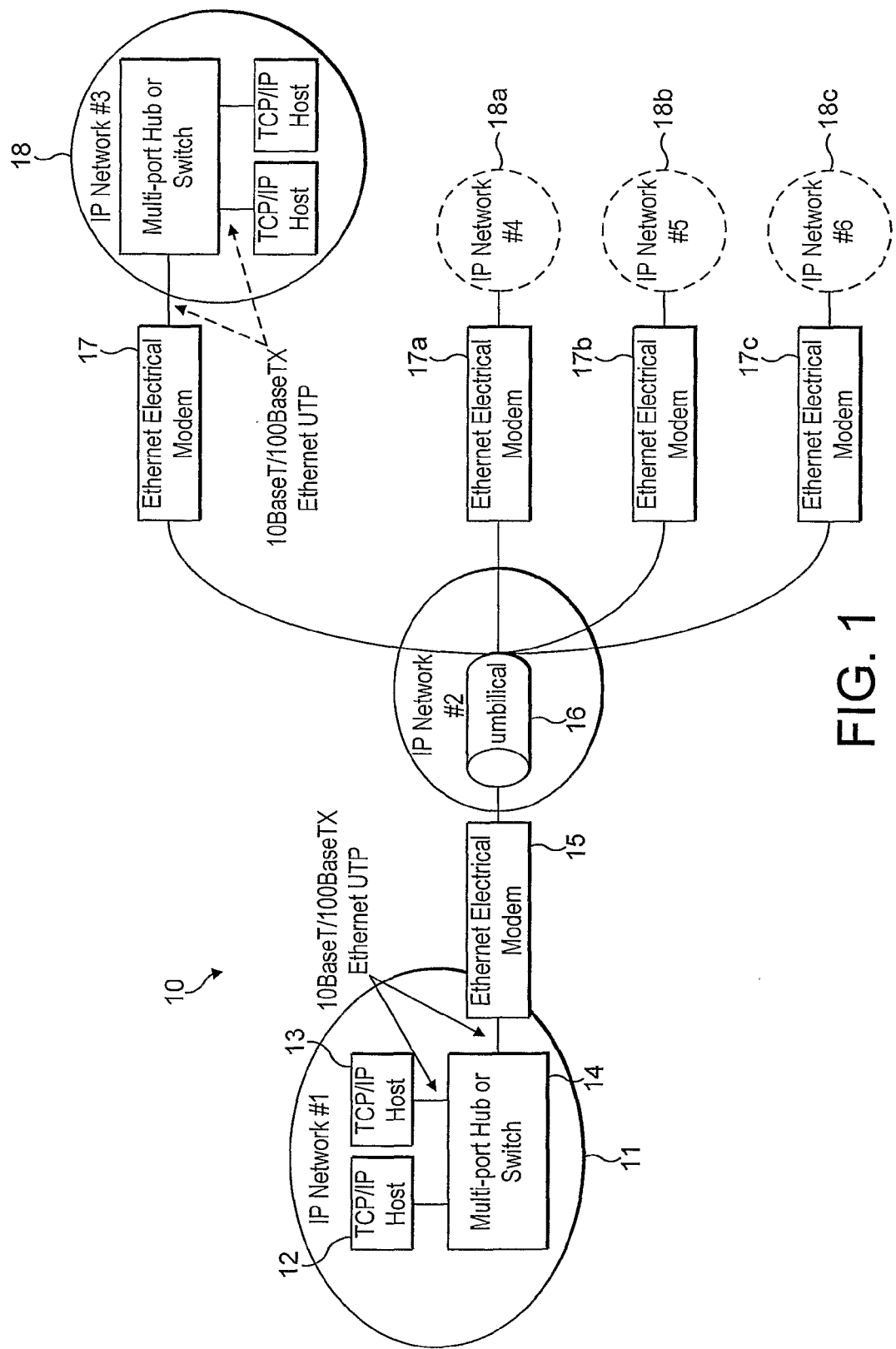
FIG. 1 is a schematic diagram of a subsea communication system.

FIG. 1 of the drawings shows by way of example a subsea communication system 10. The reference 11 denotes a subsea control unit which may contain within it TCP/IP hosts 12 and 13, and a multi-port hub or switch 14. The subsea control unit 11 has, for communicating with other units, a modem 15, particularly an Ethernet modem coupled, as hereinafter described, to an umbilical 16 which extends from the control unit 11 to the locations of subsea electronics modules. Very typically the umbilical may be of very substantial length, such as tens of kilometers.

Reference 18 denotes schematically a subsea electronics module which may include TCP/IP hosts and a multi-port hub or switch as well as a modem 17 for communicating with other units by way of the umbilical 16. Other subsea electronics modules are denoted by the references 18a, 18b and 18c and their respective modems by 17a, 17b and 17c.

Such a system provides the ability to connect TCP/IP-enabled hosts together and to allow them to communicate over long distances. The reference to the particular transmission protocol (TCP) and the addressing or network layer protocol (internet protocol) is given by way of example. The invention is not limited to such protocols.

Figure 2:
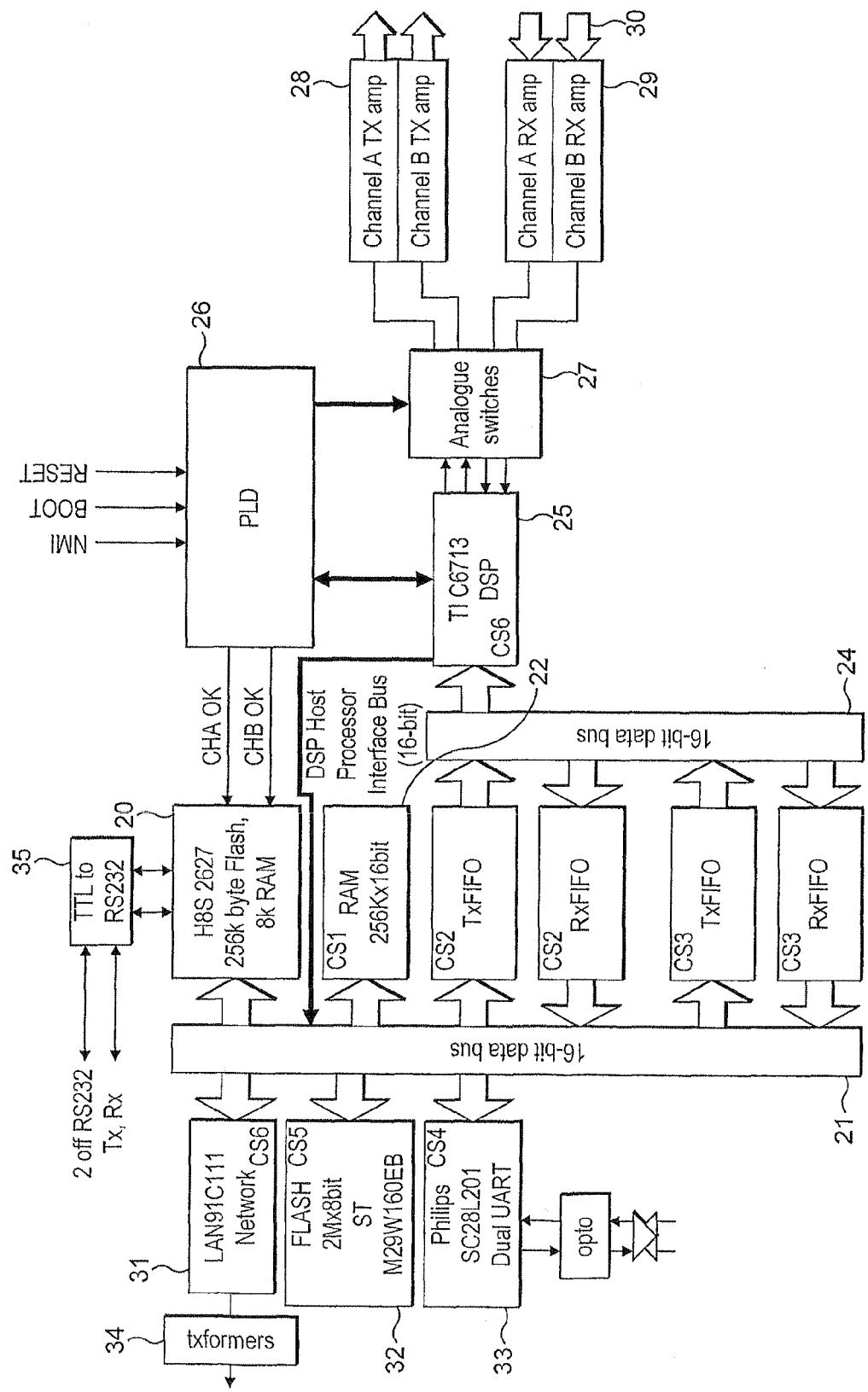
FIG. 2 is a schematic diagram of a modem for use in the system shown in FIG. 1.

FIG. 2 illustrates one of the modems which may be used in FIG. 1. In essence this modem will, for transmission, take a digital data stream and convert it into successive bursts of modulated carrier signals, preferably by means of OFDM bursts preceded by a start signal; on reception they will detect OFDM bursts employing a start signal as hereinafter described and apply transforms to reconvert the received signals back to a digital data stream.

The particular organization of the modem is not important. The modem shown in FIG. 2 is expected to perform the routing of internet protocol packets between its network interfaces.

The modem in this example comprises a microcontroller 20 (for example type H8S 2628 with 256 K flash memory and 8 K random access memory) which can communicate by way of a 16-bit data bus 21 with random access memory 22 as well as transmit and receive FIFOs 23 themselves coupled by way of a 16-bit data bus 24 to a digital signal processor (DSP) 25. This is coupled to a programmable logic device (PLD) 26 as well as analogue switches 27 that provide coupling to transmit-channel amplifiers 28 and receive channel amplifiers 29 coupled to an umbilical 30. The switches 27 and the amplifiers 28 and 29 have been shown schematically in FIG. 2; they are described in detail in FIG. 3.

The DSP 25 has an interface with the data bus 21. Coupled to the data bus 21 are a LAN interface 31, flash memory 32 and a UART 33. The LAN interface has coupling transformers 34. The microcontroller 20 also has a RS232 interface 35.

The primary interface is the LAN interface 31 which includes software configured in any desired manner to auto detect the speed of the connected network and whether it is full or half duplex. The microcontroller 20 is expected to implement a half-duplex logical bus topology and a data link protocol to carry the internet protocol packets on the umbilical.

When the microcontroller has a packet to transmit on an umbilical channel it writes data to a transmit FIFO 23, one word at a time. It then signals to the digital signal processor 25 that there is data to transmit. The digital signal processor 25 will receive the microcontroller's start signal as an external interrupt, indicating that a packet is in the transmit FIFO waiting to be transmitted. The digital signal processor 25 reads the packet data a word at a time from the transmit FIFO into an internal random access memory until it sees a flag denoting that the FIFO is empty. The digital signal processor 25 encodes the packet data into a digitised analogue signal to transmit onto the umbilical. It writes the signal by means of a serial interface to the relevant channel of a codec (omitted for simplicity from FIG. 2) to transmit the data.

In this example, the various elements on the system may be arranged in a token bus topology as is described and claimed in our International patent application No. PCT/GB2008/000436, but such is not essential to the present invention.

The digital signal processor 25 constantly reads data from both channels of the codec looking for a start symbol. It then determines, as will be described later, where the start of the encoded packet will begin.

Raw samples are loaded into internal random access memory and decoding is performed to reproduce a data packet. When the complete data packet has been recreated, the digital signal processor 25 writes it one word at a time into the receive FIFO for that channel. The digital signal processor 25 then clears the relevant receive FIFO bits.

Figure 3:
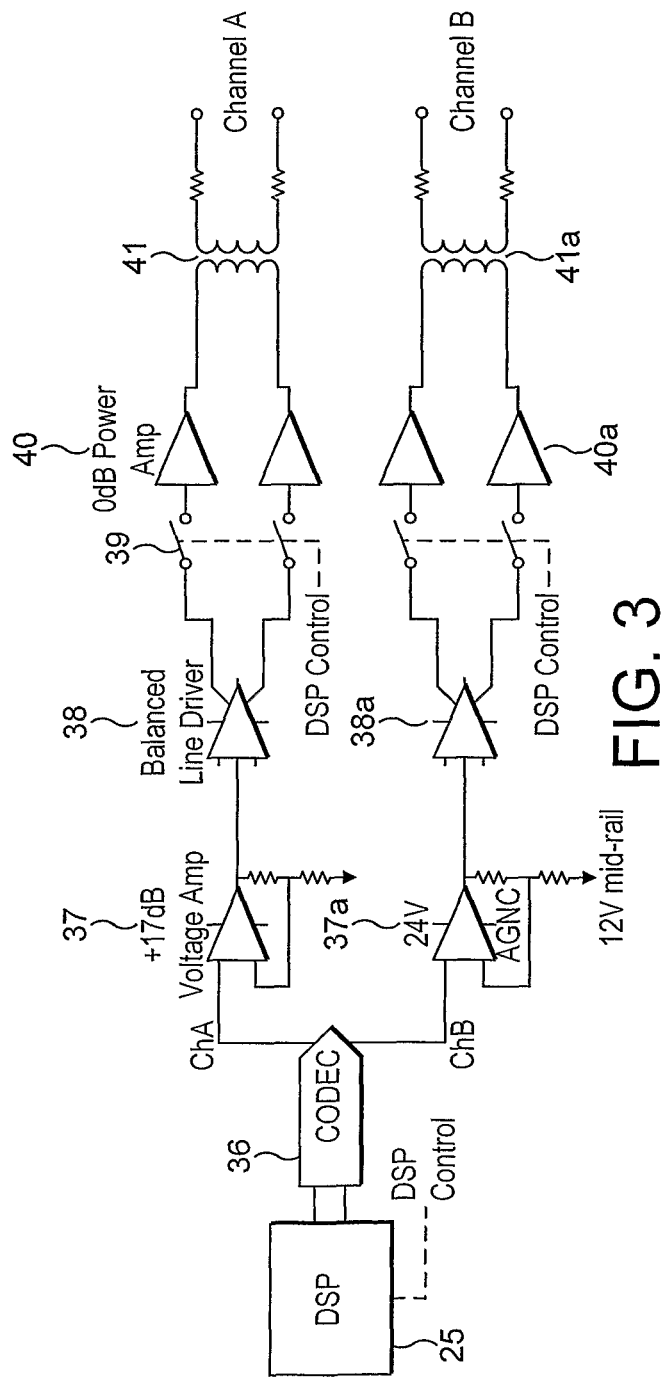
FIG. 3 is a schematic diagram of a transmit channel.

FIG. 3 illustrates a transmit channel. The digital signal processor 25 controls a codec (coder/decoder) 36 which drives two redundant transmit channels A and B. The upper channel in the drawing includes an amplifier 37, a balanced line driver 38, switches 39 controlled by the digital signal processor (and corresponding to the switches 27 in FIG. 2), power amplifiers 40 and an output transformer 41. The same components in the lower channel B are denoted (a).

Figure 4:
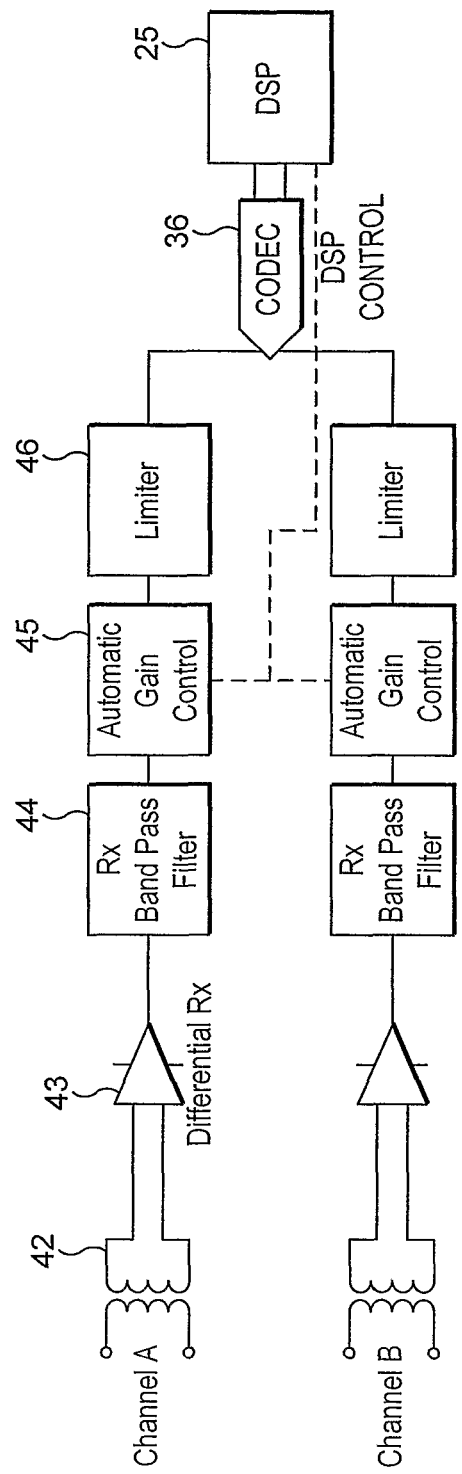
FIG. 4 is a schematic diagram of a receive channel.

Each receive channel (FIG. 4) comprises a transformer 42, a differential amplifier 43, a band-pass filter 44, an automatic gain control circuit 45, and a limiter 46 coupled to the codec 36. The lower (redundant) channel corresponds.

Figure 5:
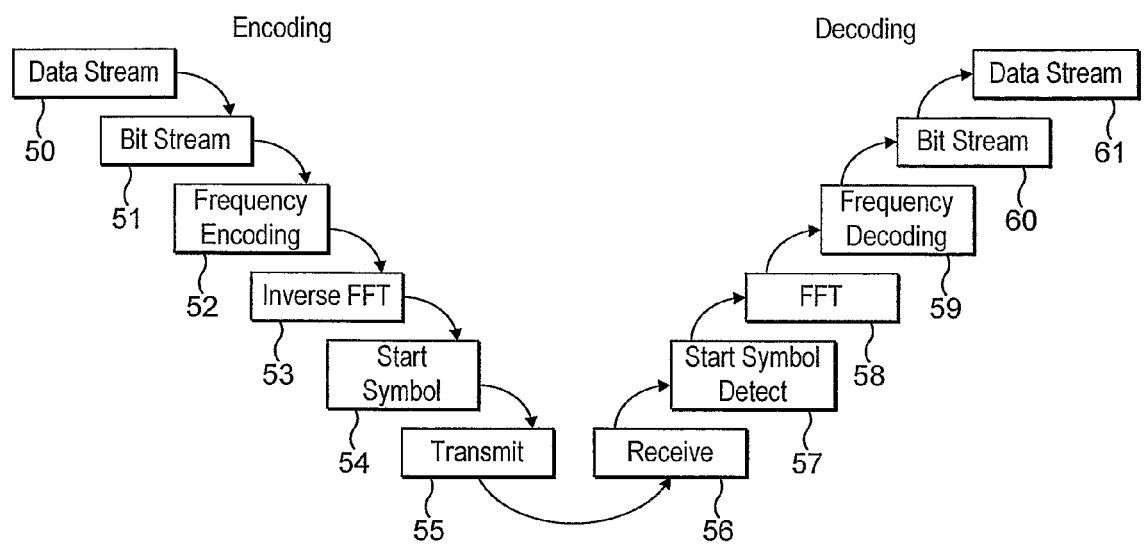
FIG. 5 is a schematic diagram of a transmit and receive process.

FIG. 5 illustrates the process of encoding and decoding a data stream. The transmitter and receiver in this example employ orthogonal frequency division multiplex to transmit data as a fixed length signal composed of multiple frequencies, each of which carry some data components.

This form of system is intended to provide reliable communication over possibly long distances, with high data rates and substantial immunity to noise. The system is intended to be either point-to-point or multi-drop but is not necessarily intended to provide any mechanism for media access control and assumes a shared bandwidth across all nodes.

As is shown in FIG. 5, the modulation process starts with a data steam 50 which is converted into a bit stream 51. The bit stream format depends upon the number of bits to be used in each of the amplitude and phase. For each of the available frequencies, the amplitude and phase is set based on the data in the bit stream. Segments of the bit stream are encoded as complex numbers and are encoded (stage 52) by means of an inverse fast Fourier transform (53) into a burst of sinusoids of orthogonal frequencies with amplitudes and phase determined by the respective complex number. The OFDM burst is appended to a start signal, stage 54, and the resultant is transmitted, stage 55. The demodulation process comprises reception 56, the detection 57 of a start symbol, the application of a fast Fourier transform 58, frequency decoding 59 and conversion to a bit stream 60 and finally conversion to the original data stream 61.

For maximum power to transfer to occur when a modem is communicating, the modem line driver output impedance and the receiver input impedance should preferably be matched to that of the umbilical, which is approximately 100 ohms. The input impedance of the receiver is just that of the transmitter since they are shorted together. Therefore to ensure that the channel receiver has the correct impedance the transmit amplifier should be enabled at all times. Otherwise the receiver would be in a higher impedance state owing to the amplifiers' reflective impedance. In order to prevent unwanted circuit noise from being amplified and causing interference with the receiver, the ability to ground these amplifiers' inputs is provided by way of a switch.

The digital signal processor 25 generates in memory a signal consisting of samples that the codec can output. Each sample is in the approximate range −32760 to +32760. The digital signal processor 25 first generates the start symbol and then generates a number of signal 'bursts' (to the length of the FFT) which contain the coded data. Once sufficient bursts have been generated to transmit the data packet to be sent, the codec 36 is instructed to begin transmitting the signal. The codec 36 may employ DMA (direct memory access) to read the memory of the digital signal processor 25 across the interconnecting serial link and outputs the signal to the analog output stages. The generated signal is then transmitted.

The decoding requires the receiver to be constantly examining the transmission line for a new signal. A signal may be preceded by a start symbol which is a number of cycles of a known frequency with a Gaussian distribution amplitude envelope applied to it, as is more fully described in our International patent application No. PCT/GB2008/000461 filed 12 Feb. 2008.

Each transmission burst being of a known, fixed length, the receiver can read in the correct number of samples after the start symbol. An FFT (fast Fourier transform) is performed on the samples to determine the amplitude and phase of each of the frequencies within the signal. The receiver knows how many bits per phase and amplitude to expect in each frequency and begins to decode the signal.

As previously indicated, for long transmission lines, the effects of the cabling are such that transmitted high frequencies are attenuated more than low frequencies.

This invention, which is employed in a communications system that uses a broad band of frequencies for each signal transmission, uses information in the lower frequencies to aid the extraction of information in the higher frequencies. This can overcome the problem of absolute amplitude encoding/decoding.

Using absolute encoding, if each frequency in the signal carried one bit of information it would have two states, zero and one. On transmission, if a one were represented by 100% amplitude, 50% amplitude might represent zero. At the receiver, even if the lowest frequency were transmitted at 100% amplitude as a reference, the effects of the cabling would reduce the amplitude of the higher frequencies such that it became impossible to decide whether a frequency were transmitted at 100% or 50%.

To overcome this, the transmitter may in accordance with the invention encode the amplitude of each frequency relative to the next lower frequency using the lowest frequency as a reference. An algorithm (used by the DSP 25) for this purpose is shown in Table 1.

TABLE 1

```
float AmpEncode (int bits, int nbits, float prevAmp)
{
    int nstates = 1<<nbits ;
    float r, amp, power, prevpower
    r = 0.5F + (float)bits / (2.0F* ((float)nstates − 1)) ;
    prevpower = prevAmp* prevAmp
    power=prevpower*r
    if (power <= 0.5F)
    {
        power = prevpower / r ;
    }
    amp = sqrtf (power) ;
    return amp
}
```

Table 1 shows an example of an algorithm, expressed in 'C' source code, used to generate the amplitude for a frequency based on the amplitude of the previous frequency. The function may be used to calculate the amplitudes of all the frequencies used in the transmission, starting with the lowest frequency which is always primed with a "1.0". The function takes three parameters, the previous (lower) frequency's amplitude (prevAmp), the number of bits encoded into each frequency (nbits) and the data value to be encoded into the current frequency (bits).

The algorithm first calculates the number of states that each frequency can carry; i.e. $2^{nbits}$. For example, nbits=2 the number of states is 4.

The algorithm then computes a ratio r, to use for the data value to be carried in the current frequency.

For example, if nbits=2, nstates=4 and the data value (bits)=0, then:

$$r=0.5+0/(2*(4-1)), \text{ i.e. } r=0.5$$

If the data value=2, then:

$$r=0.5+2/(2*(4-1)), \text{ i.e. } r=0.833$$

The algorithm then calculates the previous power as the square of the previous amplitude. The previous power multiplied by r is used to calculate the power for the current frequency.

If the resulting power is less than or equal to 0.5, the algorithm uses the previous frequency's power divided by r as the current frequency's power to ensure that each frequency has sufficient power to be decoded at the receiver.

Having calculated a power, the algorithm takes the square root of this power to obtain the amplitude the transmitter should use for the current frequency.

Reference is now made to Table 2 below, which expresses in 'C' code an algorithm which can be used on reception to decode the data from the amplitude of each received frequency, assuming an amplitude of unity for the first (lowest) transmitted frequency.

The algorithm employs three parameters, namely (nbits), (Amp) and (prevAmp). The first (nbits) is the number of bits encoded into each carrier frequency, the second (Amp) is the amplitude of the current frequency at the receiver and the third (prevAmp) is the amplitude of the previous (lower) frequency.

TABLE 2

```
Int AmpDecode(int nbits, float amp, float prevAmp)
{
        int nstates = 1<<nbits
        float r, x, power, prevpower
        int xb
        prevpower = preAmp * prevAmp
        power = Amp* Amp
        if (power < prevpower)
                r = power/prevpower
        } else {
        r = prevpower / power
        }
        x = (r - 0.5F) * 2 * (nstates - 1)
        xb = (int) roundf (x)
        if (xb < 0) {
                xb = 0;
        }
        return xb
}
```

The algorithm calculates the power of the previous frequency and the power of the current frequency. It then calculates a ratio, r, of the powers, depending on which power is the greater. This ensures that r is between 0 and 1.

The algorithm then calculates the data value (x) carried by the frequency with this ratio.

For example if r=0.8 then nstates=4 and the data value (bits)=0, then:

$$x=(r-0.5)*2*(4-1), \text{ i.e. } x=1.8$$

This value (x) is then rounded employing the function 'int xb', to the nearest integer value, '2 ' in this example, which is the data value carried by the amplitude component in the given carrier frequency.

TABLE 3

| Freq | Data | Tx Amp | Roll-off | Rx Amp | Data | Valid? |
|------|------|--------|----------|--------|------|--------|
| 1 | 1 | 707 | 1 | 707 | 1 | Y |
| 2 | 1 | 707 | 0.982878 | 694.8947 | 1 | Y |
| 3 | 1 | 707 | 0.964830 | 682.1347 | 1 | Y |
| 4 | 0 | 1000 | 0.945750 | 945.7498 | 0 | Y |
| 5 | 1 | 1000 | 0.925513 | 925.5129 | 1 | Y |
| 6 | 1 | 1000 | 0.903969 | 903.9694 | 1 | Y |
| 7 | 0 | 707 | 0.880939 | 622.8239 | 0 | Y |
| 8 | 1 | 707 | 0.856201 | 605.3342 | 1 | Y |
| 9 | 1 | 707 | 0.829482 | 586.4439 | 1 | Y |
| 10 | 0 | 1000 | 0.800437 | 800.4371 | 0 | Y |
| 11 | 1 | 1000 | 0.768622 | 768.6218 | 1 | Y |
| 12 | 1 | 1000 | 0.733452 | 733.4516 | 1 | Y |
| 13 | 0 | 707 | 0.694135 | 490.7532 | 0 | Y |
| 14 | 1 | 707 | 0.649561 | 459.2395 | 1 | Y |
| 15 | 1 | 707 | 0.598104 | 422.8595 | 1 | Y |
| 16 | 1 | 707 | 0.537244 | 379.8312 | 1 | Y |
| 17 | 1 | 707 | 0.462756 | 327.1688 | 0 | N |
| 18 | 0 | 1000 | 0.366726 | 366.7258 | 1 | N |
| 19 | 1 | 1000 | 0.231378 | 231.3782 | 0 | N |

Table 3 above shows a practical example of transmission and reception wherein 19 frequencies are transmitted, each carrying one bit of data, with the value of either 0 or 1. The first Data column shows the respective data value carried by the respective carrier. The column 'Tx Amp' shows the amplitude of each frequency on transmission, calculated using the algorithm shown in Table 1 (scaled up to a full scale of 1000). The 'Roll-off' column shows a typical effect of applying to each case transmitted amplitude the attenuation expected from the transmission line. This attenuation increases monotonically with frequency. The result in each case, i.e. the amplitude of the respective carrier at the receiver, is shown in the column 'Rx Amp', the amplitude at the receiver. The second Data column shows the decoded data value for each carrier frequency after the application of the algorithm in Table 2. The final column (Valid?) indicates whether the data was received correctly (Y) or not (N).

The technique uses the fact that between one frequency and the next there is only a small change in attenuation even though the attenuation of the last (highest) frequency is large compare to the attenuation of the first (lowest) frequency. As the example in Table 3 shows, once the difference in attenuation between two adjacent frequencies becomes too great, the technique will fail. This is visible for carrier frequencies 17, 18 and 19, which have not been decoded correctly.

A similar technique may be used for the compensation of phase shift, exploiting the expectation that between one frequency and the next higher (i.e., adjacent) frequency there is only a small phase shift, though the phase shift between the lowest and highest frequencies may be quite large.

A second method according to the invention employs a scheme in which a base minimum amplitude is assumed.

The lowest frequency is always transmitted as 1, at maximum amplitude. The receiver uses that as a reference for subsequent (higher) frequencies.

TABLE 4

```
float AmpEncode ( int bpa, int data)
{
        float   base       =    0.7
        int     states     =    1 <<bpa
        float   tx_amp     =    base + (data * ((1-base) /
(states - 1)));
        return tx_amp ;
}
```

Table 4 shows an implementation in 'C' code of an algorithm for the calculation of the required transmit amplitude (tx_amp) of each frequency after the first. The algorithm assumes a base minimum amplitude, here 0.7, so that there is some information in the lowest frequency. It then adds a proportion of (1-base) depending upon how many states are present. For example for a system which encodes 2 bits per amplitude (bpa):

bpa=2 states=$2^{bpa}$=4

So data can be in the range 0 to 3.

The possible values of tx_ampl are therefore:

if data=0, tx_ampl=0.7; if data=1, tx_ampl=0.8; if data=2, tx_ampl=0.9 and if if data=3, tx_ampl=1.0

Each transmitted frequency would therefore have one of these four amplitudes.

TABLE 5

```
int    AmpDecode(int bpa, float RxAmp, float PrevRxAmp,
       int PrevData )
{
float  base  = 0.7 ;
float  scale ;
float  calc_rx ;
int    data ;
if ( PrevData == 1 )
scale  =       1/PrevRxAmp ;
else
scale  =       base/PrevRxAmp ;
```

TABLE 5-continued

```
calc_rx = scale + RxAmp
if (calc_rx > base)
data = 1 ;
else
data = 0 ;
return data ;
}
//Example call of the AmpDecode( ) function...
Data[0] = AmpDecode (1, RxAmplitude [0], 1.0F, 1, 0 );
For int i= 1 ; I<NUM_FREQ; I++ )
{
data [i] = AmpDecode ( 1, RxAmplitude[i], RxAmplitude [i – 1],
Data (i – 1], i );
}
```

Table 5 shows a 'C' implementation of a decoding algorithm for the receiver. In this example only one bit of data can be encoded and decoded in each carrier frequency for simplicity, i.e. the data value is either a 1 or 0. The same technique could be used on any number of bits. The algorithm exploits the fact that the first frequency is known to be sent at full scale. Using the amplitude of the first frequency and knowing what data value this represents, subsequent amplitudes can be scaled up before determining if the scaled value represents 0 or 1. The algorithm iterates from low to high frequency, re-calculating the scaling factor from one frequency to the next and determining the data value.

Table 6 shows an example in a manner generally similar to Table 3.

TABLE 6

| Fn | data | Bpa | States | Tx amp | Attn | Roll off | Rx amp | Calc | Rx | Scale | Valid? |
|---|---|---|---|---|---|---|---|---|---|---|---|
| 1 | 1 | 1 | 2 | 1.0 | 1 | 1 | 1 | 1 | 1 | 1 | Y |
| 2 | 1 | 1 | 2 | 1.0 | 1 | 0.983 | 0.983 | 0.983 | 1 | 1.017 | Y |
| 3 | 1 | 1 | 2 | 1.0 | 1 | 0.965 | 0.982 | 0.982 | 1 | 1.036 | Y |
| 4 | 0 | 1 | 2 | 0.7 | 1 | 0.946 | 0.662 | 0.686 | 0 | 1.057 | Y |
| 5 | 1 | 1 | 2 | 1.0 | 1 | 0.926 | 0.925 | 0.979 | 1 | 1.080 | Y |
| 6 | 1 | 1 | 2 | 1.0 | 1 | 0.904 | 0.904 | 0.977 | 1 | 1.106 | Y |
| 7 | 0 | 1 | 2 | 1.0 | 1 | 0.881 | 0.617 | 0.682 | 0 | 1.135 | Y |
| 8 | 1 | 1 | 2 | 1.0 | 1 | 0.886 | 0.856 | 0.972 | 1 | 1.168 | Y |
| 9 | 1 | 1 | 2 | 1.0 | 1 | 0.829 | 0.829 | 0.969 | 1 | 1.206 | Y |
| 10 | 0 | 1 | 2 | 0.7 | 1 | 0.800 | 0.800 | 0.560 | 0 | 1.249 | Y |
| 11 | 1 | 1 | 2 | 1.0 | 1 | 0.769 | 0.769 | 0.960 | 1 | 1.301 | Y |
| 12 | 1 | 1 | 2 | 1.0 | 1 | 0.733 | 0.733 | 0.954 | 1 | 1.363 | Y |
| 13 | 0 | 1 | 2 | 0.7 | 1 | 0.694 | 0.486 | 0.662 | 0 | 1.441 | Y |
| 14 | 1 | 1 | 2 | 1.0 | 1 | 0.650 | 0.650 | 0.936 | 1 | 1.540 | Y |
| 15 | 1 | 1 | 2 | 1.0 | 1 | 0.598 | 0.598 | 0.921 | 1 | 1.672 | Y |
| 16 | 1 | 1 | 2 | 1.0 | 1 | 0.537 | 0.537 | 0.898 | 1 | 1.861 | Y |
| 17 | 1 | 1 | 2 | 1.0 | 1 | 0.463 | 0.463 | 0.861 | 1 | 2.161 | Y |
| 18 | 0 | 1 | 2 | 0.7 | 1 | 0.367 | 0.257 | 0.555 | 0 | 2.727 | Y |
| 19 | 1 | 1 | 2 | 1.0 | 1 | 0.231 | 0.231 | 0.631 | 0 | 3.025 | N |

In this table,

Fn = the number of the carrier frequency, data is the transmitted data, bpa = bits per amplitude, states = 2 exp (bpa), Tx amp is the transmitted carrier amplitude, 'attn' is an attenuation presumed from the characteristics of the transmission line, The 'Roll-off' column shows a typical effect of applying to each case transmitted amplitude the attenuation expected from the transmission line.

'Rx amp' is the amplitude of the received carrier,

'Calc' is the calculated amplitude for the carrier,

'Rx' is the computed data value,

'Scale' is the ratio of the received and calculated amplitudes, and 'Valid?' indicates whether the received value is valid or not.

In the example of Table 6 there is one bit encoded on each frequency so that 'data' is either 0 or 1. The bits per amplitude (bpa) is unity for each carrier. The number states is 2 for each carrier.

The transmit amplitudes are calculated by the encoder as 0.7 (the particular example of base amplitude) or 1.0. Applied to the transmit amplitudes is a roll-off similar to that shown in Table 3.

The amplitude at the receiver is shown in the 'Rx Amp' column. The scaled amplitude calculated by the algorithm is shown in the 'Calc' column. From this the data value is shown in the 'Rx' column. If the 'Calc' value is greater than the base amplitude (0.7 in this example) the Rx value it is deemed to be a 1; otherwise it is deemed to be a 0.

The technique again uses the fact that between one frequency and the next there is probably only a small change in attenuation even though the attenuation of the last (highest) frequency is large compare to the attenuation of the first (lowest) frequency. As the example shows once the difference in attenuation between two frequencies becomes too great, the technique will fail. This is visible for frequency 19 which has not been decoded correctly.

The example above shows the effect on the line of the roll-off for higher frequencies. Attenuation (shown as unity in Table 6) can be applied to all received frequencies (which would be the case on a long transmission line) in addition to the roll-off and the technique is still effective.

Table 7 below shows that the receiver can still decode the data with the same roll-off applied and an attenuation of 0.0001 (−80 dB). Table 7 differs from Table 6 in that the received amplitude for the first (lowest) carrier is 0.0001 instead of unity and the other received amplitudes are similarly attenuated.

TABLE 7

| F | data | Bpa | States | Tx amp | Roll off | Rx amp | Calc | Rx | Scale | Valid? |
|---|------|-----|--------|--------|----------|--------|------|----|-------|--------|
| 1 | 1 | 1 | 2 | 1.0 | 1 | 0.0001000 | 1 | 1 | 10000 | Y |
| 2 | 1 | 1 | 2 | 1.0 | 0.983 | 0.0000983 | 0.983 | 1 | 10174.204 | Y |
| 3 | 1 | 1 | 2 | 1.0 | 0.965 | 0.0000982 | 0.982 | 1 | 10364.522 | Y |
| 4 | 0 | 1 | 2 | 0.7 | 0.946 | 0.0000662 | 0.686 | 0 | 10573.621 | Y |
| 5 | 1 | 1 | 2 | 1.0 | 0.926 | 0.0000925 | 0.979 | 1 | 10804.820 | Y |
| 6 | 1 | 1 | 2 | 1.0 | 0.904 | 0.0000904 | 0.977 | 1 | 11062.322 | Y |
| 7 | 0 | 1 | 2 | 1.0 | 0.881 | 0.0000617 | 0.682 | 0 | 11351.524 | Y |
| 8 | 1 | 1 | 2 | 1.0 | 0.886 | 0.0000856 | 0.972 | 1 | 11679.499 | Y |
| 9 | 1 | 1 | 2 | 1.0 | 0.829 | 0.0000829 | 0.969 | 1 | 12.55.714 | Y |
| 10 | 0 | 1 | 2 | 0.7 | 0.800 | 0.0000800 | 0.560 | 0 | 12493.174 | Y |
| 11 | 1 | 1 | 2 | 1.0 | 0.769 | 0.0000769 | 0.960 | 1 | 13010.300 | Y |
| 12 | 1 | 1 | 2 | 1.0 | 0.733 | 0.0000733 | 0.954 | 1 | 13634.165 | Y |
| 13 | 0 | 1 | 2 | 0.7 | 0.694 | 0.0000486 | 0.662 | 0 | 14406.427 | Y |
| 14 | 1 | 1 | 2 | 1.0 | 0.650 | 0.0000650 | 0.936 | 1 | 15395.018 | Y |
| 15 | 1 | 1 | 2 | 1.0 | 0.598 | 0.0000598 | 0.921 | 1 | 16719.500 | Y |
| 16 | 1 | 1 | 2 | 1.0 | 0.537 | 0.0000537 | 0.898 | 1 | 18613.351 | Y |
| 17 | 1 | 1 | 2 | 1.0 | 0.463 | 0.0000463 | 0.861 | 1 | 21609.640 | Y |
| 18 | 0 | 1 | 2 | 0.7 | 0.367 | 0.0000257 | 0.555 | 0 | 27268.330 | Y |
| 19 | 1 | 1 | 2 | 1.0 | 0.231 | 0.0000231 | 0.631 | 0 | 39253.497 | Y |

The example in Table 7 above shows the effect on the line of the roll-off for higher frequencies. Attenuation (shown as unity in Table 6) can be applied to all received frequencies (which would be the case on a long transmission line) in addition to the roll-off and the technique is still effective. Table 7 shows that the receiver can still decode the data with the same roll-off applied and an attenuation of 0.0001 (−80 dB).

In the foregoing the component of the carriers which is adjusted to compensate for the characteristics of the transmission line is amplitude. For a communications system that uses a broadband of frequencies the effects of a long transmission line can be such that there is a significant shift in phase between the lowest frequencies and the highest frequencies used. At the receiver, the large shift in phase between the lowest frequency and the highest frequency can be accounted for by taking the first, lowest frequency as a point of reference. From this, subsequent carrier frequencies' phases can be calculated based on their received phase and the phase of the previous (lower) carrier frequency.

To encode the data as a phase of a carrier frequency, the algorithm shown in Table 8 may be used.

TABLE 8

```
float PhaseEncode(int bits, int nbits , float prevPhase)
{
    int nstates = 1<<nbits;
    float x;
    x = prevPhase + 2.0 * π * (float)bits / (float)nstates;
    return Mod2PI(x);
}
```

The PhaseEncode( ) function provides the phase for a single frequency. It is called each time a frequency's phase setting is required. The integer 'bits' is the value of the data to be transmitted. The integer 'nbits' is the number of bits carried in each frequency (2 in the example above) and prevPhase' is the value returned by the previous call to the function for the previous (lower) frequency. An example of practical implementation is shown in Table 9.

TABLE 9

| Freq | Tx Data | prevPhase | x | 2π | Mod2π(x) | Phase | Phase/π |
|------|---------|-----------|---|----|----|-------|---------|
| 1 | 0 | 0.000 | 0.000 | 6.283 | 0.000 | 0.000 | 0.00 |
| 2 | 1 | 0.000 | 1.571 | 6.283 | 1.571 | 1.571 | 0.50 |
| 3 | 2 | 1.571 | 4.712 | 6.283 | 4.712 | 4.712 | 1.50 |
| 4 | 3 | 4.712 | 9.425 | 6.283 | 3.142 | 3.142 | 1.00 |
| 5 | 3 | 3.142 | 7.854 | 6.283 | 1.571 | 1.571 | 0.50 |
| 6 | 0 | 1.571 | 1.571 | 6.283 | 1.571 | 1.571 | 0.50 |
| 7 | 2 | 1.571 | 4.712 | 6.283 | 4.712 | 4.712 | 1.50 |
| 8 | 0 | 4.712 | 4.712 | 6.283 | 4.712 | 4.712 | 1.50 |
| 9 | 0 | 4.712 | 4.712 | 6.283 | 4.712 | 4.712 | 1.50 |
| 10 | 1 | 4.712 | 6.283 | 6.283 | 0.000 | 0.000 | 0.00 |

TABLE 9-continued

| Freq | Tx Data | prevPhase | x | 2π | Mod2π(x) | Phase | Phase/π |
|---|---|---|---|---|---|---|---|
| 11 | 3 | 0.000 | 4.712 | 6.283 | 4.712 | 4.712 | 1.50 |
| 12 | 3 | 4.712 | 9.425 | 6.283 | 3.142 | 3.142 | 1.00 |
| 13 | 0 | 3.142 | 3.142 | 6.283 | 3.142 | 3.142 | 1.00 |
| 14 | 0 | 3.142 | 3.142 | 6.283 | 3.142 | 3.142 | 1.00 |
| 15 | 1 | 3.142 | 4.712 | 6.283 | 4.712 | 4.712 | 1.50 |
| 16 | 2 | 4.712 | 7.854 | 6.283 | 1.571 | 1.571 | 0.50 |
| 17 | 1 | 1.571 | 3.142 | 6.283 | 3.142 | 3.142 | 1.00 |
| 18 | 3 | 3.142 | 7.854 | 6.283 | 1.571 | 1.571 | 0.50 |

TABLE 9-continued

| Freq | Tx Data | prevPhase | x | 2π | Mod2π(x) | Phase | Phase/π |
|---|---|---|---|---|---|---|---|
| 19 | 2 | 1.571 | 4.712 | 6.283 | 4.712 | 4.712 | 1.50 |
| 20 | 2 | 4.712 | 7.854 | 6.283 | 1.571 | 1.571 | 0.50 |

For Table 9 it is assumed that 2 bits of data are encoded per frequency and that there are therefore 4 possible phase settings. The 'Tx Data' column shows an example of some 2-bit data values, one for each frequency. The 'Phase' column shows the value (in radians) returned by the function. For clarity, the 'Phase/π' column shows the phase value as a factor of π for that frequency. The first frequency has a phase of 0 and subsequent frequencies are set in phase depending on the data they carry.

The software function (algorithm) shown in Table 10 may be used to decode the data from a frequency given its phase.

TABLE 10

```
int PhaseDecode(int nbits, float Phase, float prevPhase)
{
    int nstates = 1<<nbits;
    float x;
    int xb;
    x = Phase - prevPhase;
    x = Mod2PI(x);
    x = x / (2.0 * π) * (float)nstates;
    xb = (int)roundf(x);
    if (xb == nstates) {
        xb = 0;
    }
    return xb;
}
```

PhaseDecode( ) returns the value of the data component carried by a single frequency. The variable 'nbits' is the number of bits carried in the frequency (2 in the example above). The value 'Phase' is the phase value measured at the receiver for the frequency and the value 'prevPhase' is the phase of the previous (lower) frequency.

Table 11 below shows a simple example of the implementation of the function shown in Table 10. It shows the transmitted phase for twenty frequencies with the same values as those shown in the encoding example given previously.

TABLE 11

| Freq | Tx phase | Phase shift | Rx Phase | x | mod2π(x) | x | Rx data | Valid? |
|---|---|---|---|---|---|---|---|---|
| 1 | 0.000 | 0.314 | 0.314 | 0.314 | 0.314 | 0.200 | 0 | Y |
| 2 | 1.571 | 0.628 | 2.199 | 1.885 | 1.885 | 1.200 | 1 | Y |
| 3 | 4.712 | 0.942 | 5.655 | 3.456 | 3.456 | 2.200 | 2 | Y |
| 4 | 3.142 | 1.257 | 4.398 | −1.257 | 5.027 | 3.200 | 3 | Y |
| 5 | 1.571 | 1.571 | 3.142 | −1.257 | 5.027 | 3.200 | 3 | Y |
| 6 | 1.571 | 1.885 | 3.456 | 0.314 | 0.314 | 0.200 | 0 | Y |
| 7 | 4.712 | 2.199 | 6.912 | 3.456 | 3.456 | 2.200 | 2 | Y |
| 8 | 4.712 | 2.513 | 7.226 | 0.314 | 0.314 | 0.200 | 0 | Y |
| 9 | 4.712 | 2.827 | 7.540 | 0.314 | 0.314 | 0.200 | 0 | Y |
| 10 | 0.000 | 3.142 | 3.142 | −4.398 | 1.885 | 1.200 | 1 | Y |
| 11 | 4.712 | 3.456 | 8.168 | 5.027 | 5.027 | 3.200 | 3 | Y |
| 12 | 3.142 | 3.770 | 6.912 | −1.257 | 5.027 | 3.200 | 3 | Y |
| 13 | 3.142 | 4.084 | 7.226 | 0.314 | 0.314 | 0.200 | 0 | Y |
| 14 | 3.142 | 4.398 | 7.540 | 0.314 | 0.314 | 0.200 | 0 | Y |
| 15 | 4.712 | 4.712 | 9.425 | 1.885 | 1.885 | 1.200 | 1 | Y |
| 16 | 1.571 | 5.027 | 6.597 | −2.827 | 3.456 | 2.200 | 2 | Y |
| 17 | 3.142 | 5.341 | 8.482 | 1.885 | 1.885 | 1.200 | 1 | Y |
| 18 | 1.571 | 5.655 | 7.226 | −1.257 | 5.027 | 3.200 | 3 | Y |
| 19 | 4.712 | 5.969 | 10.681 | 3.456 | 3.456 | 2.200 | 2 | Y |
| 20 | 1.571 | 6.283 | 7.854 | −2.827 | 3.456 | 2.200 | 2 | Y |

The sum of the Tx Phase and the Phase Shift is shown in the Rx Phase column. Each of the subsequent columns shows the source code (Table 10) working line by line.

There are two columns which show the value of x. The first is given after the line, in the source code (Table 10): x=Phase−prevPhase. The second column shows the value of x after the line, in the source code: x=x/(2.0*π)*(float)nstates.

The value of x (in the third column from the right in Table 11) is rounded up or down to the nearest integer and assigned to 'xb' with the line: xb=(int)roundf(x).

The result is shown in the Rx Data column. The value is given by 'xb' at the point where the line 'return xb' is called in the source code (Table 10).

The column 'Valid?' is the result of a comparison of the Rx Data with the respective Tx Data shown in Table 9 to show that the data was received and decoded correctly.

The phase shift used in this example increases linearly from 0 to 2π over the range of frequencies employed.

Other methods of encoding and decoding may be employed. A component of a carrier may be set in relation to the corresponding component of a neighbouring carrier which is for example the next but one carrier; but such methods are more complex than those described above.

It is also feasible to impose an additional monotonic increase in the amplitude with frequency of the transmitted carriers to provide compensation for the roll-off of the characteristic of the transmission line.

What is claimed is:

1. A method of communicating on a subsea transmission line a set of carrier signals of different frequencies ranging from a lowest frequency to a highest frequency, the method comprising:

at a first location, encoding the amplitude of each of said carrier signals above the lowest frequency with a data value, the amplitude of each encoded carrier signal above the lowest frequency being set for transmission in accordance with a ratio relative to the amplitude of a lower frequency carrier signal;

at a second location, receiving said encoded carrier signals from said subsea transmission line encoded in accordance with said encoding step; and decoding each said received encoded carrier signal by scaling the amplitude of that received carrier signal to compensate for the ratio used to set the transmission amplitude of that carrier signal and to recover said data value thereby compensating for the frequency-dependent effect of the subsea transmission line on the amplitudes of the carrier signals.

2. The method of claim 1, wherein:

said lower frequency carrier signal is a neighboring carrier signal which has a lower frequency than the carrier signal being encoded but which is within one or two consecutive carrier signal frequencies within said set of carrier signals; and said decoding step comprises scaling the amplitude of said each received carrier signal in accordance with a ratio representative of the received amplitudes of said each carrier signal and the neighboring lower frequency carrier signal.

3. The method of claim 2, wherein said ratio representative of a received amplitude is a ratio of the powers of that carrier signal and the neighboring low frequency carrier signal.

4. The method of claim 2, wherein said carrier signals comprise a burst of orthogonal frequency division multiplexed (OFDM) signals.

5. The method of claim 2, further comprising:

at said first location, encoding the phase of each of said carrier signals with a second data value, said phase being set in relation to the phase of the next adjacent lower frequency carrier signal augmented by the ratio of (a) said second data value in bits and (b) a predetermined maximum number of data bits.

6. The method of claim 1, wherein said neighboring lower frequency carrier signal is the carrier signal of the next adjacent lower frequency as compared to the frequency of said carrier signal being encoded or decoded.

7. The method of claim 1, in which said lower frequency carrier signal is the carrier signal of the lowest frequency and wherein the step of encoding comprises:

(a) causing said carrier signal of the lowest frequency to have a predetermined amplitude representing a known data value; and (b) causing each of said carrier signals having frequencies above said lowest frequency to have an amplitude selected to have a ratio, relative to said predetermined amplitude, determined by the data value to be encoded; and the step of decoding comprises scaling up the received amplitude of each received carrier signal using said carrier signal of the lowest frequency as a reference.

8. The method of claim 7, wherein one data value is represented by said predetermined amplitude, for which said ratio is unity, and another data value is represented by a base amplitude.

9. The method of claim 8, wherein said base amplitude has a ratio of substantially 0.7 relative to said predetermined amplitude.

10. The method of claim 7, wherein said carrier signals comprise a burst of orthogonal frequency division multiplexed (OFDM) signals.

11. The method of claim 7, further comprising;

at said first location, encoding the phase of a carrier signal with a second data value, said phase for that carrier signal being set in relation to the phase of the next adjacent lower frequency carrier signal augmented by the ratio of (a) said second data value in bits and (b) a predetermined maximum number of data bits.

12. Apparatus for communicating on a subsea transmission line carrier signals of different frequencies ranging from a lowest frequency to a highest frequency, said apparatus comprising:

at a first location, an encoder configured to encode the carrier signals such that the amplitude of each carrier signal above the lowest frequency carrier signal encodes a data value, and the amplitude of each other carrier signal is set for transmission via said subsea transmission line in accordance with a first ratio, relative to the amplitude of a neighboring lower frequency carrier signal, computed from the amplitude of said lower frequency carrier signal in accordance with a ratio dependent on the data value to be encoded; and at a second location, a decoder configured to decode carrier signals received via said subsea transmission line by scaling each received carrier signal amplitude in accordance with a second ratio, representative of the received carrier signal amplitude and the amplitude of said neighboring lower frequency carrier signal, to recover said data value and to compensate for a frequency-dependent effect of the subsea on amplitudes of the carrier signals.

13. The apparatus of claim 12, wherein said second ratio representative of received amplitudes is a ratio of the powers of the carrier signal and the neighboring low frequency carrier signal but which is within one or two increments of carrier signal frequencies within said carrier signals.

14. The apparatus of claim 12, wherein said neighboring lower frequency carrier signal is the carrier signal of frequency next adjacent below the frequency of the carrier signal being encoded or decoded.

15. The apparatus of claim 12, wherein said carrier signals comprise a burst of orthogonal frequency division multiplexed (OFDM) signals.

16. Apparatus for communicating on a subsea transmission line carrier signals of different frequencies ranging from a lowest frequency to a highest frequency, said apparatus comprising:

at a first location, an encoder configured to encode said carrier signals for transmission onto said subsea transmission line such that the carrier signal at said lowest frequency has a predetermined amplitude which represents a known data value, and the amplitude of each other carrier signal above the lowest frequency carrier signal encodes a data value, the amplitude of each other carrier signal being selected to have a ratio, relative to said predetermined amplitude, determined by the data value to be encoded; and at a second location a decoder configured to decode a carrier signal received from said subsea transmission line by scaling up the received carrier signal amplitude using said carrier signal of the lowest frequency as a reference, whereby to recover the encoded data value and to compensate for a frequency-dependent effect of the subsea transmission line on the amplitudes of the carrier signals.

17. The apparatus of claim 16, wherein one data value is represented by said predetermined amplitude, for which the ratio is unity, and another data value is represented by a base amplitude.

18. The apparatus of claim 17, wherein said base amplitude has a ratio of substantially 0.7 relative to said predetermined amplitude.

19. The apparatus of claim 16, wherein the carrier signals comprise a burst of orthogonal frequency division multiplexed (OFDM) signals.

20. A modem for communicating on a subsea transmission line carrier signals of different frequencies ranging from a lowest frequency to a highest frequency, said modem comprising:
    an encoder configured to encode the carrier signals such that the amplitude of each carrier signal above the lowest frequency carrier signal encodes a data value, and the amplitude of each other carrier signal is set for transmission via said subsea transmission line in accordance with a first ratio, relative to the amplitude of a neighboring lower frequency carrier signal, computed from the amplitude of said lower frequency carrier signal in accordance with a ratio dependent on the data value to be encoded; and
    a decoder configured to decode carrier signals received by scaling each received carrier signal amplitude in accordance with a second ratio, representative of the received carrier signal amplitude and the amplitude of said neighboring lower frequency carrier signal, to recover said data value and to compensate for a frequency-dependent effect of the subsea transmission line on amplitudes of the carrier signals.

21. The modem of claim 20, wherein said second ratio representative of received amplitudes is a ratio of the powers of the carrier signal and the neighboring low frequency carrier signal but which is within one or two increments of carrier signal frequencies within said carrier signals.

22. The modem of claim 20, wherein said neighboring lower frequency carrier signal is the carrier signal of frequency next adjacent below the frequency of the carrier signal being encoded or decoded.

23. A modem for communicating on a subsea transmission line carrier signals of different frequencies ranging from a lowest frequency to a highest frequency, said modem comprising:
    an encoder configured to encode said carrier signals such that the carrier signal at said lowest frequency has a predetermined amplitude which represents a known data value, and the amplitude of each other carrier signal above the lowest frequency carrier signal encodes a data value, the amplitude of each other carrier signal being selected to have a ratio, relative to said predetermined amplitude, determined by the data value to be encoded; and
    a decoder configured to decode a received carrier signal by scaling up the received carrier signal amplitude using said carrier signal of the lowest frequency as a reference, whereby to recover the encoded data value and to compensate for a frequency-dependent effect of the subsea transmission line on the amplitudes of the carrier signals.

24. The modem of claim 23, wherein one data value is represented by said predetermined amplitude, for which the ratio is unity, and another data value is represented by a base amplitude.

25. The modem of claim 24, wherein said base amplitude has a ratio of substantially 0.7 relative to said predetermined amplitude.

* * * * *